United States Patent
Ausserlechner

(10) Patent No.: US 9,903,741 B2
(45) Date of Patent: Feb. 27, 2018

(54) MAGNETIC POSITION SENSOR AND SENSING METHOD

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 120 days.

(21) Appl. No.: 14/856,169

(22) Filed: Sep. 16, 2015

(65) Prior Publication Data

US 2016/0076910 A1 Mar. 17, 2016

(30) Foreign Application Priority Data

Sep. 17, 2014 (DE) .................. 10 2014 113 374

(51) Int. Cl.
*G01D 5/12* (2006.01)
*G01D 5/245* (2006.01)

(52) U.S. Cl.
CPC .................. *G01D 5/2452* (2013.01)

(58) Field of Classification Search
CPC ...... G01D 5/142; G01D 5/145; G01D 5/2033; G01D 5/2241; G01B 7/00; G01B 7/14; G01B 7/30; G01R 33/02; G01R 15/20; G01R 15/202; G01R 21/08; G01R 33/06; G01R 33/07; G01R 33/077; G01R 33/09; G11B 2005/0016
USPC .............. 324/207.11, 207.13, 207.2, 207.21, 324/207.22, 207.23, 207.24, 207.25, 260
See application file for complete search history.

(56) References Cited

U.S. PATENT DOCUMENTS

| | | | | |
|---|---|---|---|---|
| 4,533,872 A | * | 8/1985 | Boord | G01C 17/28 324/247 |
| 5,648,851 A | * | 7/1997 | Kellner | G01B 11/002 250/237 R |
| 9,116,199 B2 | | 8/2015 | Deak et al. | |
| 2005/0193583 A1 | * | 9/2005 | Schmied | G01D 5/2452 33/605 |
| 2005/0194968 A1 | | 9/2005 | Schmied | |
| 2011/0101964 A1 | | 5/2011 | Ausserlechner et al. | |
| 2011/0103173 A1 | * | 5/2011 | May | G01D 5/145 366/64 |
| 2013/0278118 A1 | * | 10/2013 | Maze | F16C 41/007 310/68 B |

(Continued)

FOREIGN PATENT DOCUMENTS

| | | |
|---|---|---|
| CN | 102052927 A | 5/2011 |
| CN | 102297652 A | 12/2011 |

(Continued)

*Primary Examiner* — Tung X Nguyen
*Assistant Examiner* — Robert P Alejnikov, Jr.
(74) *Attorney, Agent, or Firm* — Shumaker & Sieffert, P.A.

(57) ABSTRACT

Embodiments of the present disclosure relate to a magnetic position sensor (100; 200). The magnetic position sensor (100; 200) includes a magnetic field source (110; 210) with at least a first multi-pole magnet strip (120-1; 220-1) arranged on a first surface and with at least a second multi-pole magnet strip (120-2; 220-2) arranged on a second surface perpendicular to the first surface. The first and the second multi-pole magnet strips are arranged in a fixed relative position to each other and comprise different numbers of magnet poles (130; 132; 230; 232) along a common length.

20 Claims, 5 Drawing Sheets

(56) References Cited

U.S. PATENT DOCUMENTS

| | | | |
|---|---|---|---|
| 2013/0335073 A1* | 12/2013 | Deak | B82Y 25/00 |
| | | | 324/207.21 |
| 2014/0197820 A1* | 7/2014 | Ritter | G01D 5/145 |
| | | | 324/207.13 |
| 2014/0197822 A1 | 7/2014 | Ritter et al. | |

FOREIGN PATENT DOCUMENTS

| | | |
|---|---|---|
| DE | 19818799 A1 | 6/1999 |
| DE | 102004010948 A1 | 10/2005 |
| DE | 102004001570 A1 | 12/2005 |
| DE | 202014002597 U1 | 6/2014 |

\* cited by examiner

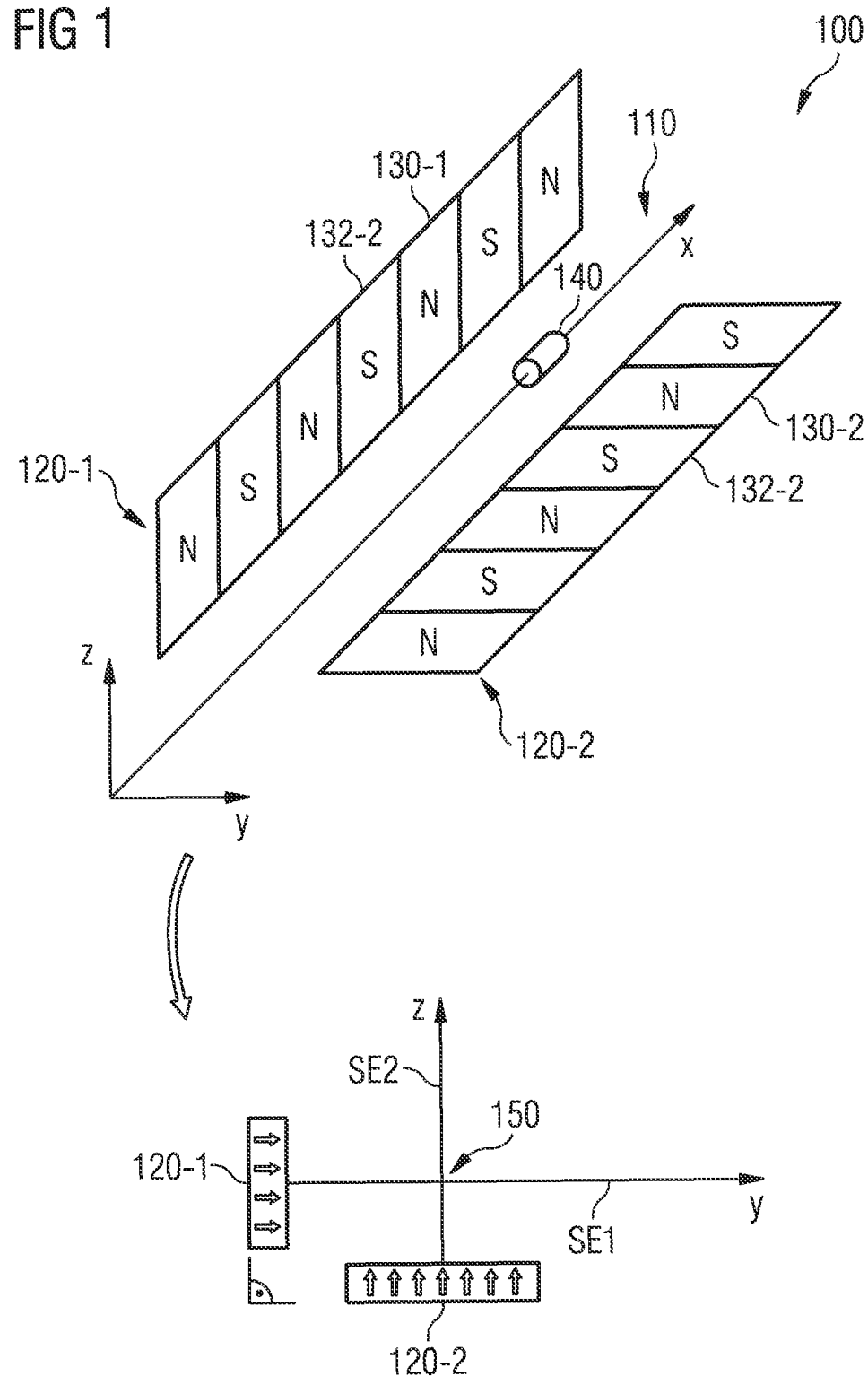

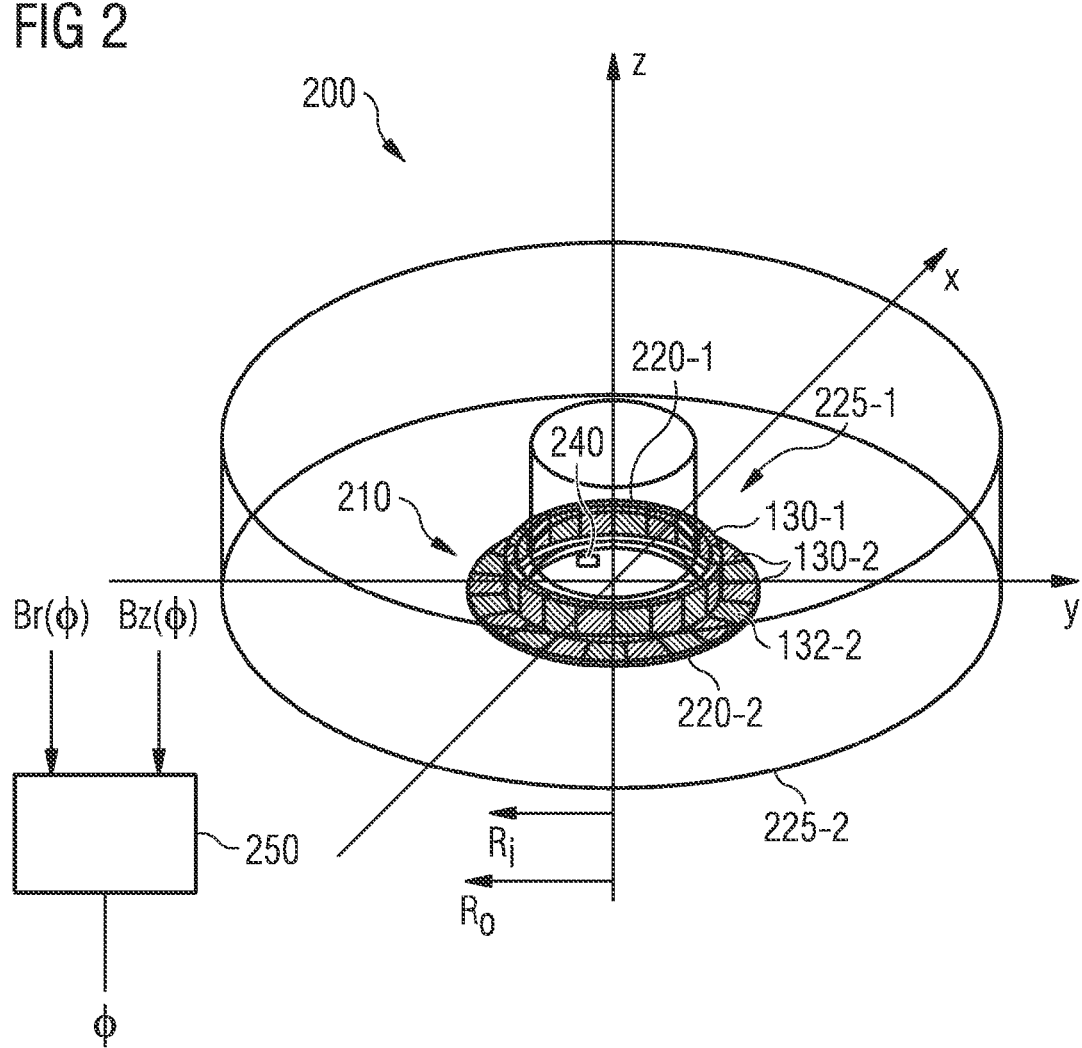

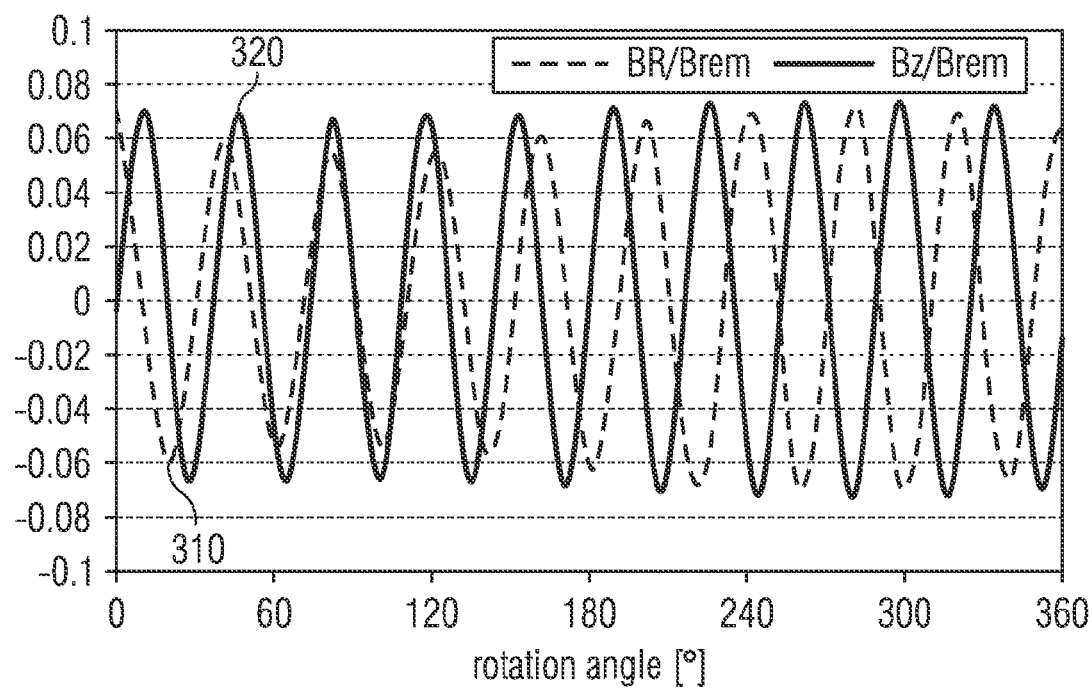

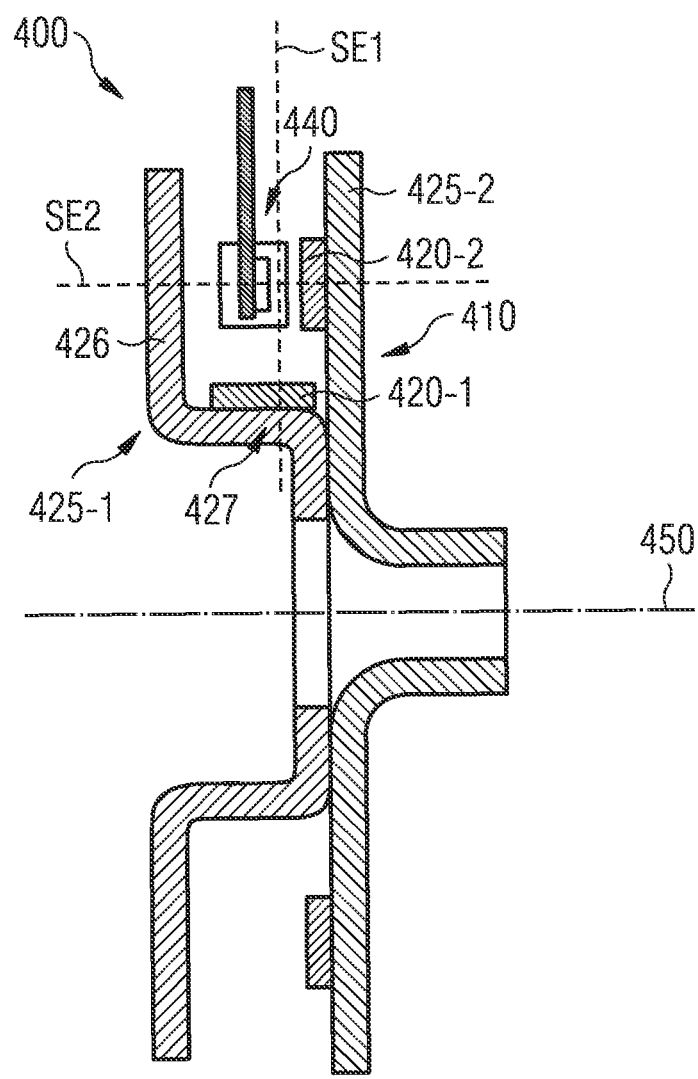

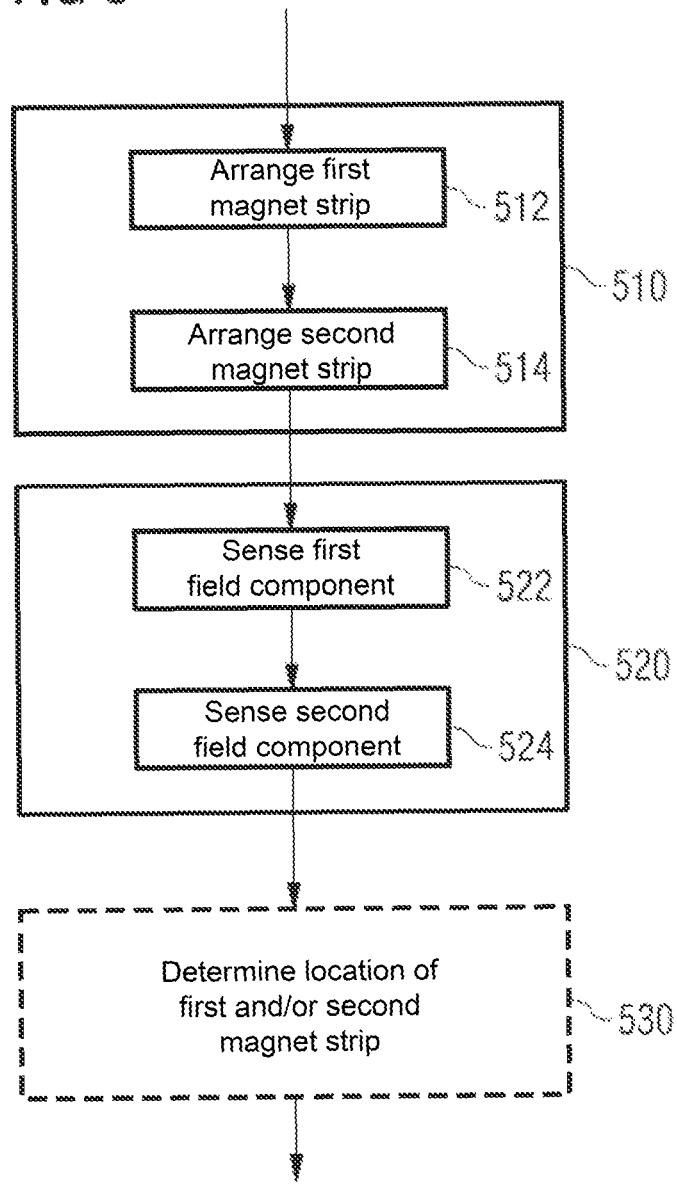

MAGNETIC POSITION SENSOR AND SENSING METHOD

Embodiments of the present disclosure generally relate to sensors and more particularly to magnetic position sensors.

BACKGROUND

In various applications there is a need for accurate, repeatable and reliable measurement of linear and/or rotary motion and position. For example, magnetic sensors can be used for such linear and/or rotary motion and position sensing. For this purpose, one or more permanent magnets may be attached to a target, and the magnetic field resulting from the one or more permanent magnets may be measured by one or more magnetic sensors.

Some magnetic position sensor make use of so-called multi-pole magnet(ic) strips. A multi-pole magnet strip provides alternating north and south poles across the length of the strip. A resulting alternating magnetic field across the length of the strip may enable a sensor to read and identify its position along the magnetic strip. For example, multi-pole permanent magnetic encoders may be used for wheel speed sensing in automotive systems.

Conventional solutions for position sensing using magnetic sensors suffer from drawbacks, however. Some solutions do not have the capability to sense position in multiple dimensions. Others are not accurate and/or require mathematically complex calculations that are difficult to carry out with limited silicon area.

Therefore, there is a need for roved magnetic position sensors, sensing systems and methods.

SUMMARY

Some simplifications may be made in the following summary, which is intended to highlight and introduce some aspects of the various example embodiments, but such simplifications are not intended to limit the scope of embodiments. Detailed descriptions of preferred example embodiments adequate to allow those of ordinary skill in the art to make and use the inventive concepts will follow in later sections.

According to a first aspect of the present disclosure, it is provided a magnetic position sensor. The magnetic position sensor includes a magnetic field source with at least a first multi-pole magnet strip arranged on a first surface and with at least a second multi-pole magnet strip arranged on a second surface which is perpendicular to the first surface. The first and the second multi-pole magnet strips are arranged in a fixed relative position to each other. They comprise different numbers of magnet poles or pole pairs along a common length corresponding to a common displacement or travel path.

In some embodiments, the first multi-pole magnet strip extends in a first direction and the second multi-pole magnet strip extends in a second direction parallel to or collinear with the first direction.

In one embodiment, the first and the second multi-pole magnet strips both extend linearly on or within their respective surfaces. Here, the first and the second surface may be planar surfaces, respectively.

In another embodiment, the first and the second multi-pole magnet strip both extend circularly. Here, at least one of the first and the second surface may be a curved or bent surface, e.g., a cylindrical surface.

In some embodiments, the magnetic poles of a same magnetic polarity (i.e., "north" or "south") or at least pole pairs of the first and the second multi-pole magnet strip have respective equal geometric dimensions. In this way, a regular periodic magnetic field may be achieved for the first and the second multi-pole magnet strip, respectively. Due to the different numbers of magnet poles or pole pairs along the common length, the spatial periods of the magnetic fields of the first and the second multi-pole magnet strip are different.

In one embodiment, the numbers of magnet pole pairs along the travel path differ by one between the first and the second multi-pole magnet strip.

In some embodiments, the first and/or the second multi-pole magnet strip may be arranged on at least one ferromagnetic substrate. Additionally or alternatively, the first and/or the second multi-pole magnet strip may be arranged in between two ferromagnetic shields.

In some embodiments, the magnetic field source including the first and the second multi-pole magnet strip is movable relative to at least one magnetic field sensor.

In some embodiments, the magnetic position sensor may further include a first magnetic field sensor element sensitive to a first directional component of a magnetic field generated by the magnetic field source including the first and the second multi-pole strip. The magnetic position sensor may further include a second magnetic field sensor element sensitive to a second directional component of the magnetic field generated by the magnetic field source. The first and the second directional magnetic field components may be perpendicular to each other.

In one embodiment, the first magnetic field sensor element may be arranged at a first sensing location where a magnetic field generated by the second multi-pole strip has a negligible first directional component. The second magnetic field sensor element may be arranged at a second sensing location where the magnetic field generated by the first multi-pole strip has a negligible second directional component. Here, "negligible" may be understood as below a predefined threshold or substantially zero. In some embodiments, the sensing locations are the same for the first and the second magnetic field sensor elements.

In some embodiments, the first and second directional magnetic field components are perpendicular to a relative moving direction between the magnetic field sensor element(s) and the magnetic field source.

In some embodiments, the magnetic position sensor may further include a processor module which is configured to determine a position of the magnetic field source, for example relative to a sensing location, based on a comparison or combination of sensed or measured first and second directional magnetic field components.

In some embodiments, the sensing location(s) of the magnetic field sensor element(s) may be at or near an intersection of a first symmetry plane of the first multi-pole magnet strip and a second symmetry plane of the second multi-pole magnet strip. Thereby, the first symmetry plane may be perpendicular to the first surface and parallel or concentric to the second surface, while the second symmetry plane may be perpendicular to the second surface and parallel or concentric to the first surface.

According to a second aspect of the present disclosure, it is provided a magnetic position sensor system. The magnetic position sensor system includes a magnetic field source with at least a first multi-pole magnet strip which is arranged on a first surface and extends in a first direction. The magnetic field source also includes at least a second multi-pole magnet strip which is arranged on a second surface perpendicular to the first surface and extends in a second direction parallel to the first direction. The first and the second multi-pole magnet strips comprise different numbers of magnet poles along a common length. The magnetic position sensor further includes a magnetic field sensor module at a sensing location. The magnetic field sensor module comprises a first magnetic field sensor unit configured to measure a first directional component of a magnetic field caused at the sensing location by the magnetic field source and a second magnetic field sensor unit configured to measure a second directional component of the magnetic field caused at the sensing location by the magnetic field source. The first and the second directional magnetic field components are perpendicular to each other.

In one embodiment, for example, for measuring linear motion and/or position, the first and the second multi-pole magnet strip both extend linearly on their respective surfaces. In another embodiment, for example, for measuring rotary motion and/or position, the first and the second multi-pole magnet strip both extend circularly. Here, the detected first and second directional magnetic field components may be perpendicular to a rotary motion of the first and the second multi-pole magnet strip.

According to yet a further aspect of the present disclosure, it is provided a sensing method. The method includes providing a superimposed magnetic field by arranging at least a first multi-pole magnet strip on a first surface and by arranging at least a second multi-pole magnet strip on a second surface perpendicular to the first surface. Thereby the first and the second multi-pole magnet strip are provided with different numbers of magnet poles or pole pairs along a common length. The method further includes measuring, at a sensing location, a first component of the superimposed magnetic field and detecting, at the sensing location, a second component of the superimposed magnetic field.

In some embodiments, providing the superimposed magnetic field includes arranging the first multi-pole magnet strip in a fixed position relative to the second multi-pole magnet strip and moving the first and the second multi-pole magnet strip in a common direction relative to the sensing location(s).

In some embodiments, the method further comprises determining a location of the first and/or the second multi-pole magnet strip relative to the sensing location by combining or comparing the measured first and second magnetic field components or by combining signals indicative of the measurements.

In some embodiments, measuring the first and/or the second component comprises measuring the first and/or second component at or at least near an intersection of a first symmetry plane of the first multi-pole magnet strip and a second symmetry plane of the second multi-pole magnet strip.

Some embodiments comprise digital circuitry stalled within a magnetic position sensor apparatus for performing the respective aforementioned methods. Such a digital control circuitry, e.g., a Digital Signal Processor (DSP), a Field-Programmable Gate Array (FPGA), an Application-Specific Integrated Circuit (ASIC), or a general purpose processor, needs to be programmed accordingly. Hence, yet further embodiments also provide a computer program having a program code for performing embodiments of the method, when the computer program is executed on a computer or a programmable hardware device.

BRIEF DESCRIPTION OF THE FIGURES

Some embodiments of apparatuses and/or methods will be described in the following by way of example only, and with reference to the accompanying figures, in which FIG. 1 schematically illustrates some parts of a magnetic position sensor system according to a first embodiment;

FIG. 2 illustrates some parts of a magnetic position sensor system according to a second embodiment;

FIG. 3 shows an exemplary course of magnetic field strength versus rotation angle;

FIG. 4 schematically shows a shielded magnetic position sensor system; and

FIG. 5 illustrates a flowchart of an example sensing method.

DESCRIPTION OF EMBODIMENTS

Various example embodiments will now be described more fully with reference to the accompanying drawings in which some example embodiments are illustrated.

Accordingly, while embodiments are capable of various modifications and alternative forms, embodiments are shown by way of example in the drawings and will herein be described in detail. It should be understood, however, that there is no intent to limit example embodiments to the particular forms disclosed, but on the contrary, embodiments are to cover all modifications, equivalents, and alternatives falling within the scope of the claims. Like numbers may refer to like elements throughout the description of the figures. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or group thereof.

It should also be noted that in some alternative implementations, the functions/acts noted may occur out of the order noted in the figures. For example, figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description may be presented in terms of software, or algorithms and symbolic representations of operation of data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), Digital Signal Processors (DSPs), Application-Specific integrated Circuits, Field Programmable Gate Arrays (FPGAs), computers, or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including Read Only Memory (ROM), Random Access Memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments or at least parts thereof may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, sub-routine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 schematically illustrates parts of a magnetic position sensor 100.

Magnetic position sensor 100 includes a magnetic field source 110 comprising at least a first multi-pole magnet strip 120-1 arranged on a first surface and comprising at least a second multi-pole magnet strip 120-2 arranged on a second surface which is perpendicular to the first surface. In the illustrated example implementation, the first surface corresponds to an x-z-plane (y=const.) in parallel to the plane spanned by the x- and z-axes of a Cartesian coordinate system, while the second surface corresponds to an x-y-plane (z=const.) in parallel to the plane spanned by the x- and y-axes of the Cartesian coordinate system. According to embodiments, the first multi-pole magnet strip 120-1 and the second multi-pole magnet strip 120-2 are arranged or installed in a fixed relative position to each other and comprise different numbers of magnet poles 130-1, 132-1, 130-2, 132-2 or pole pairs along a common length corresponding to a common displacement or travel path. Here, the reference signs 130-1 and 130-2 denote respective magnetic north poles, while reference signs 132-1 and 132-2 denote respective magnetic south poles. To this end, a number of small permanent magnets may reside along their respective linear extension. The higher said number, the higher may be a potential resolution of the magnetic position sensor 100.

In the illustrated example embodiment of FIG. 1, the magnetic field source 110 including the first and the second multi-pole magnet strips 120-1 and 120-2 is linearly movable relative to at least one magnetic field sensor 140 configured to sense different magnetic field components of a superimposed magnetic field generated by the first and the second multi-pole magnet strips 120-1 and 120-2. A possible location of the magnetic field sensor 140 may be at or at least near an intersection 150 of a first symmetry plane SE1 of the first multi-pole magnet strip 120-1 and a second symmetry plane SE2 of the second multi-pole magnet strip 120-2, i.e., the x-axis in the example embodiment of FIG. 1. Thereby, the first symmetry plane SE1 (e.g., the plane z=0) is perpendicular to the first surface of the first multi-pole magnet strip 120-1 and parallel to the second surface of the second multi-pole magnet strip 120-2, while the second symmetry plane SE2 (e.g., the plane y=0) is perpendicular to the second surface of the second multi-pole magnet strip 120-2 and parallel to the first surface of the first multi-pole magnet strip 120-1. The intersection line of SE1 and SE2 (e.g., the x-axis with y=z=0) corresponds to the direction of movement of the magnetic field source 110.

In the example implementation of FIG. 1, both multi-pole magnet strips 120-1 and 120-2 extend linearly (straight) and in parallel in x-direction. In particular, the first multi-pole magnet strip 120-1 has a main extension in a first direction parallel to the x-axis and the second multi-pole magnet strip 120-2 has a main extension in a second direction parallel to the first direction, hence also parallel to the x-axis. The planar surfaces in which the multi-pole magnet strips 120-1 and 120-2 are arranged, for example, the x-z-plane (y=const.) for strip 120-1 and the x-v-plane (z=const.) for strip 120-2, are at least substantially perpendicular to each other. The skilled person will appreciate that slight deviations from perpendicularity can occur due to typical manufacturing tolerances. Geometric dimensions for the multi-pole magnet strips 120-1 and 120-2 may depend on the application of the magnetic position sensor 100. However, in some applications their respective length in x-direction could be several cm, while their respective width and height could by in the mm range, for example. In some embodiments, the multi-pole magnet strips 120-1 and 120-2 may be arranged in close proximity to each other.

The multi-pole strips 120-1 and 120-2 both extending in x-direction both generate a magnetic field B, respectively, having the following spatial characteristic:

$$B_x \sim \sin(2\pi x/\lambda)$$

$$B_y \sim \cos(2\pi x/\lambda)$$

$$B_z \sim \cos(2\pi x/\lambda)$$

Here, $B_x$, $B_y$, and $B_z$ denote the respective orthogonal components of the magnetic field B in x-, y-, and z-direction and λ denotes the spatial periodic length (or wavelength) of the respective directional magnetic field components $B_x$, $B_y$, and $B_z$. Thereby, λ depends on the respective magnetic pole patterns, i.e., the geometric dimensions of the respective poles 130, 132.

In the x-z-plane (e.g., defined by y=0) and denoted as symmetry plane SE2 in the lower portion of FIG. 1, the $B_y$-field component caused by multi-pole magnet strip 120-2 substantially disappears for all x-, z-positions. Ideally, a $B_y$-field component measured in the x-z-plane SE2 may hence be uniquely associated with multi-pole magnet strip 120-1. In the x-y-plane (e.g., defined by z=0) and denoted as symmetry plane SE1 in the lower portion of FIG. 1, the $B_z$-field component caused by multi-pole magnet strip 120-1 substantially disappears for all x-, y-positions. Ideally, a $B_z$-field component measured in the x-y-plane SE1 may hence uniquely associated with multi-pole magnet strip 120-2. In other words, at an intersection of SE1 and SE2, e.g. corresponding to the x-axis, measured $B_y$-field components may be associated with the first multi-pole magnet strip 120-1, while $B_z$-field components may be associated with the second multi-pole magnet strip 120-2. For this reason, the intersection of the symmetry planes SE1 and SE2 may be regarded as a preferred location for magnetic field sensor 140.

If in x-direction a path of displacement length $L_x$ is defined along which the magnetic field components of the multi-pole magnet strips 120-1 and/or 120-2 should be clearly linked to an x-position, this may be achieved by providing the first multi-pole magnet strip 120-1 with a number $p_1$ of identical pole pairs in $L_x$, whereas the second multi-pole magnet strip 120-2 may have a different number $p_2$ of identical pole pairs along $L_x$. Note that the displacement length $L_x$ (e.g. 10 cm) may be equal to or shorter than a total length of the multi-pole magnet strips (e.g. 12 cm). Hence, in some embodiments magnetic poles of the same magnetic polarity or at least the pole pairs of the first multi-pole magnet strip 120-1 may have substantially equal geometric dimensions. Similarly, magnetic poles of the same magnetic polarity or at least the pole pairs of the second multi-pole magnet strip 120-2 may have substantially equal geometric dimensions. This also includes an example configuration, where all north poles of a multi-pole magnet strip may be of larger geometric dimension than all the south poles of the same multi-pole magnet strip, or vice versa. Between neighboring poles or pole-pairs there may be a small non-magnetic region, which may be caused by manufacturing limitations or intentionally to design smoother transitions.

A unique association between the x-position and the resulting magnetic field in the interval $0 \leq x \leq L_x$ may be achieved, if the absolute value $|p_1-p_2|=1$, i.e. the multi-pole magnet strips 120-1, 120-2 have respective numbers of pole pairs which differ e.g. by 1. Hence, the numbers of magnet pole pairs per length $L_x$ may differ by one between the first and the second multi-pole magnet strip 120-1, 120-2. Such multi-pole magnet strips according to the present disclosure may also be denoted as orthogonal, incommensurable multi-pole magnet strips.

In some embodiments, the aforementioned linear displacement x of the magnetic field source 110 (including the first and the second multi-pole magnet strips 120-1 and 120-2) relative to the magnetic field sensor 140 may also be turned into a circular arc. This circular arc may also be closed such that we obtain multi-pole magnetic rings or multi-pole magnetic discs/wheels instead of the linear multi-pole magnet strips 120-1, 120-2. Hence, in some embodiments the first and the second multi-pole magnet strip may both extend circularly. A corresponding example implementation is schematically illustrated in FIG. 2.

The example magnetic position sensor system 200 of FIG. 2 includes a magnetic field source 210 comprising a first circular multi-pole magnet strip 220-1 and arranged on a cylindrical first surface 225-1. The first circular multi-pole magnet strip 220-1 will also be denoted as a multi-pole magnet ring in the following. The magnetic field source 210 also comprises a second circular multi-pole magnet strip arranged on a disc-like second surface 225-2 which is perpendicular to the first surface 225-1. The second circular multi-pole magnet strip 220-2 will also be denoted as a multi-pole magnet disc or wheel 220-2. In the illustrated example, the first surface 225-1 corresponds to a skin surface of a cylinder having a longitudinal extension in z-direction. The z-axis defines a rotation axis for the magnetic position sensor system which may be used in automotive systems for position and speed sensing. The second surface 225-2 corresponds to the x-y-plane spanned by the x- and y-axes of a Cartesian coordinate system with its z-axis being the rotation axis. The first multi-pole magnet ring 220-1 and the concentric second multi-pole magnet disc 220-2 extend circularly in a fixed relative position to each other and comprise different numbers of magnet poles 230-1, 232-1, 230-2, 232-2 or pole pairs along their respective circumferences. Here, the reference signs 230-1 and 230-2 denote respective magnetic north poles, while reference signs 232-1 and 232-2 denote respective magnetic south poles.

In some embodiments, the first multi-pole magnet ring 220-1 and the second multi-pole magnet disc 220-2 may be fixed to a shaft, whose angular position or velocity should be converted into an electronic signal. Also small or medium sized drives may use these encoders to control the rotation of the shaft. To this end a number of small permanent magnets resides along their respective circumference. They produce a respective magnetic field which is periodic with respect to the angle of rotation. When the shaft rotates the (superimposed) magnetic field of the magnetic field source 210 passes a magnetic field sensor module 240. The sensor module 240 may convert apparent oscillations of first and second directional magnetic field components into digital pulses of an electronic output signal which may then be fed to a processor module 250 configured to determine an (angular) position of the shaft or the magnetic field source 210 relative to the sensing location of the sensor module 240. Thereby the position may be determined based on a combination of the detected first and second magnetic field components.

Hence, in some embodiments, the magnetic field source 210 including the first and the second circular multi-pole magnet strips 220-1 and 220-2 is rotatably or rotary movable relative to at least one magnetic field sensor 240. Here, the z-axis forms a common rotation axis. A preferred location of the magnetic field sensor 240 may be at or at least near the (circular) intersection line of a third surface (symmetry surface or plane of ring 220-1), which is parallel to the x-y-plane and extends through the (axial) center of ring 220-1 and a fourth surface (symmetry surface of disc 220-2) which is the skin surface of a cylinder that is coaxial (i.e., same symmetry) axis) with the disc 220-2 and has a distance R4=sqrt(Ri*Ro), whereby Ri and Ro are inner and outer radius of the disc 220-2. Thereby, R4 defines the radial center of disc 220-2. Again, the (e.g., planar) third surface or the symmetry plane of ring 220-1 is perpendicular to the (e.g., cylindrical) first surface of the first circular multi-pole magnet strip 220-1 and parallel to the (e.g. planar) second surface of the second circular multi-pole magnet strip 220-2, while the (e.g., cylindrical) fourth surface or the symmetry surface of second circular multi-pole magnet strip 220-2 is perpendicular to the (e.g. planar) second surface of the second circular multi-pole magnet strip 220-2 and parallel or concentric to the (e.g., cylindrical) first surface of the first circular multi-pole magnet strip 220-1. The circular intersection line of the symmetry surfaces corresponds to the circular direction of movement of the example magnetic field source 210.

In the illustrated example implementation of FIG. 2, both circular multi-pole magnet strips 220-1 and 220-2 extend circularly and in parallel (concentric) in circumferential or tangential direction around the curved or cylindrical surface 225-1. In particular, the first circular multi-pole magnet strip 220-1 has a main extension in a first direction parallel to the circumferential direction and the second circular multi-pole magnet strip 220-2 has a main extension in a second direction parallel to the first direction, hence, also parallel to the circumferential direction. The straight directions within the surfaces in which the circular multi-pole magnet strips 220-1 and 220-2 are arranged, for example, the z-direction within the cylindrical surface 225-1 for strip 220-1 and the radial direction within the x-y-plane for strip 220-2, are at least substantially perpendicular to each other.

In the cylindrical symmetry surface of multi-pole magnet disc 220-2 (defined by radius r=R4), the $B_r$-field component of multi-pole magnet disc 220-2 substantially disappears for all positions on the cylindrical symmetry surface. A $B_r$-field component measured in the cylindrical symmetry surface may hence be uniquely associated with the multi-pole magnet ring 220-1. In the multi-pole magnet ring's symmetry plane $z=(z_{max}+z_{min})/2$ with $z_{min}$ and $z_{max}$ being bottom and top z-positions of the multi-pole magnet ring 220-1, respectively, the $B_z$-field component of multi-pole magnet ring 220-1 substantially disappears for all x-, y-positions. A $B_z$-field component measured in the symmetry plane $z=(z_{max}+z_{min})/2$ may hence uniquely be associated with multi-pole magnet disc 220-2. In other words, ideally at or near an intersection of the cylindrical symmetry surface of multi-pole magnet disc 220-2 and the symmetry plane of multi-pole magnet ring 220-1, $B_r$-field components may be associated with the first multi-pole magnet ring 220-1 and $B_z$-field components may be associated with the second multi-pole magnet disc 220-2.

If in circumferential direction a circular displacement path corresponding to a maximum rotation angle Θ is defined along which the magnetic fields of the circular multi-pole magnet strips 220-1 and/or 220-2 should be clearly linked to a rotation angle ϕ, this can be achieved by providing the first circular multi-pole magnet strip 220-1 with a number $p_1$ of identical pole pairs around along its circumference corresponding to the maximum rotation angle Θ, whereas the second circular multi-pole magnet strip 220-2 has a different number $p_2$ of identical pole pairs along its circumference corresponding to the maximum rotation angle Θ. Note that the allowable maximum rotation angle Θ (e.g. 115°) may be equal to or smaller than 360°. By allowable maximum rotation angle we mean an angular range for which the sensor system can uniquely determine the rotation angle. For a windscreen wiper, for example, it may be enough to provide an allowable maximum rotation angle of 115°, whereas for an electric drive one usually needs an allowable maximum rotation angle that covers the full revolution, i.e. 360°. In some embodiments, magnetic poles of the same magnetic polarity or at least the pole pairs of the first circular multi-pole magnet strip 220-1 may have substantially equal geometric dimensions. Similarly, magnetic poles of the same magnetic polarity or at least the pole pairs of the second circular multi-pole magnet strip 220-2 may have substantially equal geometric dimensions. A unique association between the rotation angle ϕ and the resulting magnetic field in the interval 0≤ϕ≤Θ may be achieved, if the absolute value $|p_1-p_2|=1$, i.e., the circular multi-pole magnet strips 220-1, 220-2 have respective numbers of pole pairs which differ e.g. by 1 along the maximum rotation angle Θ. Hence, the numbers of magnet pole pairs per rotation angle Θ may differ by one between the first and the second circular multi-pole magnet strip 220-1, 220-2.

In the illustrated example of FIG. 2, the multi-pole magnet ring 220-1 and the multi-pole magnet disc 220-2 have a respective thickness (or height) of 1 mm and a respective width of 6 mm. The inner diameter of the ring 220-1 is 28 mm, the inner diameter of the disc 220-2 is 30 mm. Ring 220-1 has 9 equally sized pole pairs along its circumference. Disc 220-2 has 10 equally sized pole pairs along its circumference. The multi-pole magnet disc's lower side is arranged in the x-r-plane, i.e., z=0. Given those example dimensions and an example magnetic field sensor location at a radial distance of r=18 mm and an axial position at z=4 mm, i.e. within the cylindrical first surface 225-1, a resulting example dependence between a magnetic field generated by the magnetic field source 210 (including the multi-pole magnet ring 220-1 and the multi-pole magnet disc 220-2) and an rotation angle of the magnetic field source 210 is shown in FIG. 3. The magnetic field components along a maximum rotation angle Θ=360° correspond to two sinusoids of different spatial wavelengths λ. The $B_r$-field component measurable at the sensor location r=18 mm and z=4 mm is denoted by reference sign 310, while the $B_z$-field component measurable at the sensor location is denoted by reference sign 320. It can be seen that the spatial wavelength λ is slightly shorter for $B_r$-field component 320 stemming from multi-pole magnet disc 220-2.

The example magnetic field sensor module 240, which may be implement as an integrated sensor chip, for example, may include at least two sensor units for the two curves 310, 320, respectively, and a processor module 250 which is configured to determine an angular position or a rotation angle ϕ of the magnetic field source 210 relative to the sensing location(s) of sensor unit(s) 240 based on a combination of the detected/measured first and second magnetic field components $B_r(\phi)$ and $B_z(\phi)$. For example, each angular position $\phi$ may correspond to a unique phase relation between the sensed first and second sinusoidal magnetic field components $B_r(\phi)$ and $B_z(\phi)$. The different sensor units may measure a course, e.g. a half period or a full period, of the first and second sinusoidal magnetic field components $B_r$ and $B_z$, respectively. The resulting sine-curves may be fitted and, hence, a phase deviation between the measured curves may be determined. In one embodiment, the angular position $\phi$ may be determined based on a look-up in a Look-Up-Table (LUT) having stored $\phi$-to-magnetic-field-component-relations. This LUT may be stored by means of a memory device.

Instead of these two components 310, 320 perpendicular to the (rotary) motion of the magnetic field source 210, the magnetic field sensor module 240 may also detect any two other components and convert them into $B_r$, $B_z$, provided that both components are not parallel or anti-parallel.

Hence, according to the present disclosure, a magnetic position sensor system may include a magnetic field source 110 or 210 with at least a first multi-pole magnet strip arranged linearly or circularly on a first surface and extending in a first direction, and at least a second multi-pole magnet strip arranged linearly or circularly on a second surface perpendicular to the first surface and extending in a second direction parallel to the first direction. The first and the second linear or circular multi-pole magnet strips comprise different numbers of magnet poles or pole pairs along a predefined displacement length, which is typically equal to the maximum travel path. The magnetic position sensor system further includes a magnetic field sensor module 240 installed at a sensing location. Said magnetic field sensor module 240 includes a first magnetic field sensor unit configured to detect a first component (e.g. $B_r$ or $B_y$) of a magnetic field caused at the sensing location by the magnetic field source. The magnetic field sensor module 240 further includes a second magnetic field sensor unit configured to detect a second component (e.g. $B_z$) of the magnetic field caused at the sensing location by the magnetic field source 110 or 210. The first and the second magnetic field components are preferably perpendicular to each other.

Since one or multiple limes differentiating a sinusoidal function again yields a sine function (with eventually shifted phase), a sensor system according to the present disclosure may also operate, if one or more sensor units detect gradients of those magnetic field components that are perpendicular to the direction of movement. For example, the gradient may be defined along the direction of movement, whereas the magnetic field component is perpendicular to the direction of movement. Such a gradient system may eliminate homogeneous interfering magnetic fields from the determination of the position x or $\phi$ of the magnetic field source 110 or 210 and may hence be more robust.

In some embodiments, the permanent magnetic multi-pole strips 120, 220 may be mounted on non-magnetic substrate or carrier discs/rings/frames. The non-magnetic substrate or carrier material may have a relative magnetic permeability $\mu_r \approx 1$. In one embodiment, however, a substrate or carrier for the first and/or the second multi-pole magnet strip may comprise ferromagnetic material with a relative magnetic permeability $\mu_r > 300$, in particular $\mu_r > 1500$, and even more particularly $\mu_r > 4000$. The ferromagnetic substrate may
 (i) amplify the magnetic fields of the first and/or the second multi-pole magnet strips, and
 (ii) shield magnetic interference originating from the outside of the sensor system.

Multi-pole magnet strips according to embodiments can have many possible forms. In particular, respective north and south poles need not necessarily be exactly of the same size. Additionally or alternatively, there may be non-magnetized areas between adjacent pole pairs or in between adjacent north and south poles of a pole pair. Instead of a multi-pole magnet strip also several individual magnets may be mounted on a substrate or carrier with alternating polarity. In such embodiments, the arrangement is not a homogeneous strip anymore, but may e.g. be glued together from various parts.

Additionally or alternatively, outer contours of the multi-pole magnet strips may be formed wavy or in a zig-zag pattern. Such structural modifications can be used to increase a spatial range where a multi-pole magnet strip does not cause a certain magnetic field component, for example, to increase the spatial range where multi-pole magnet strip 120-1 does not cause a $B_y$-component. Due to manufacturing tolerances it may not be guaranteed that a magnetic field sensor module 140, 240 comes to lie exactly in or at the intersection of the respective symmetry planes (or surfaces) of the first and second multi-pole magnet strips. Therefore, such modifications of the multi-pole magnet strips may be beneficial, as they may lead to still small and negligible magnetic field components even for slight deviations of the magnetic field sensor module's location from the intersection of the symmetry surfaces or planes. Such deviation may, for example, be in the range from 0.5 to 1.5 mm. For example, multi-pole magnet strip 120-1 could produce a negligibly small $B_y$-field in an area of less than about 1 mm away from the intersection of SE1 and SE2 and strip 120-2 could produce a negligibly small $B_z$ field in the same spatial region.

An advantage of magnet arrangements according to the present disclosure may be that magnetic fields caused by multi-pole magnet strips do not reach too far into space. For example, a magnetic field may focus in a space of about only 1 to 2 times the spatial wavelength $\lambda$. In this way, other surrounding parts may be less disturbed and—if they are soft magnetic (e.g., $\mu_r > 300$)—they may interfere with measurements significantly less than large magnets whose field reaches far into space.

Another characteristic of magnet arrangements according to the present disclosure may be that the multi-pole magnet strips may be effectively shielded against magnetic interference from the outside by means of their respective soft-magnetic substrate material and/or by means of additional soft-magnetic shields. An example embodiment is sketched in FIG. 4.

FIG. 4 illustrates a sectional view of a magnetic sensor system 400 to detect rotary motion and/or position. The magnetic sensor system 400 includes a magnetic field source 410 which comprises a first circular multi-pole magnet strip 420-1 arranged on a horizontally or axially extending surface 427 of a first substrate or carrier 425-1. The magnetic field source 410 also comprises a second circular multi-pole magnet strip 420-2 arranged on a radially extending surface of a second substrate or carrier 425-2. Axial and radial directions are defined with respect to rotation axis 450. Hence, the two circularly extending multi-pole magnet strips 420-1 and 420-2 are installed substantially perpendicular to each other. The first substrate 425-1 also comprises a radially extending portion 426 coupled to the axially extending portion 427. A magnetic field sensor module 440 is arranged axially in between the respective radial outer portions of the first and the second substrates 425-1 and 425-2 possibly near an intersection of the respective symmetry planes SE1 and SE2 of the multi-pole magnet strips 420-1 and 420-2. The skilled person will appreciate that the first and the second substrate 425-1, 425-2 may act as ferromagnetic shields for the sensor module 440, the first and/or the second multi-pole magnet strips 420-1, 420-2, if the substrates comprise ferromagnetic material.

In embodiments, the multi-pole magnet strips may be made from a homogenous common magnetic material covering the perpendicular surfaces and being magnetized with different pole patterns. However, it may be simpler to manufacture the multi-pole magnet strips separately, for example, on separate substrates. After that the multi-pole magnet strips may be fixed to each other, for example, by means of screwing, staking, gluing, welding, folding, etc. When mounted, the multi-pole magnet strips may be spaced apart from each other. However, in some embodiments they may also touch each other, i.e., the may be in direct contact.

In particular with separate assembly, the different multi-pole magnet strips may comprise different material(s). In one example, a first multi-pole magnet strip could comprise a plastic-bound ferrite material, while a second first multi-pole magnet strip could comprise a plastic-bound rare earth material. In this way the magnetic field component may be increased which is detected from a magnetic field sensor unit having weaker or poor sensitivity. For example, a first magnetic field component could be detected by a vertical Hall sensor. Thereby, a vertical Hall sensor is a magnetic field sensor which is sensitive to a magnetic field that runs parallel to the surface of a semiconductor chip. A second magnetic field component could be detected by a Hall plate. Usually the vertical Hall sensor has worse sensitivity. Therefore, the magnetic field component to be detected by the vertical Hall sensor may be generated from a stronger magnetic material.

Instead of using stronger or weaker magnetic materials, also a thickness and/or a width of the multi-pole magnet strips may be varied. A further option would be to vary the distance between a magnetic field sensor unit or element to its associated multi-pole magnet strip. That is to say, the magnetic field sensor units at the sensing location may be arranged closer to one of the at least two multi-pole magnet strips.

The size of the magnetic poles of the multi-pole magnet strips should be neither too small nor too large. If it is too small, the resulting magnetic field in a given distance to the multi-pole magnet strip might be too small, leading to potential detection/measurement inaccuracies. If the size of the poles is too large in the direction of movement, the magnetic characteristics versus direction of movement may be not well enough sinusoidal, but of rectangular or triangular shape—again leading to potential detection/measurement inaccuracies with respect to movement and/or position. Hence, a good approach may be to find a compromise between the two extremes. The size of a pole may be chosen dependent on the distance between sensor unit and the respective multi-pole magnet strip.

The skilled person will appreciate that the example embodiments of the magnetic position sensor devices described herein may be used to perform a corresponding sensing method. A schematic flowchart of an example sensing method 500 is illustrated in FIG. 5.

Method 500 includes an act 510 of providing a superimposed magnetic field by arranging 512 at least a first multi-pole magnet strip on a first surface and by arranging 514 at least a second multi-pole magnet strip on a second surface perpendicular to the first surface. Thereby the first and the second multi-pole magnet strip are provided with different numbers of magnet poles or pole pairs (e.g., per predefined displacement length). Method 500 further includes sensing 522, at a sensing location, a first component of the superimposed magnetic field, and sensing 524, at the sensing location, a second component of the superimposed magnetic field.

As has been explained above, providing 510 the superimposed magnetic field may comprise arranging the first multi-pole magnet strip in a fixed position relative to the second multi-pole magnet strip. The first and the second multi-pole magnet strip may then be moved in a common direction relative to the sensing location where a magnetic field sensor module is installed.

Method 500 may further include an act 530 of determining a location of the first and/or the second multi-pole magnet strip, i.e. the magnetic field source, relative to the sensing location by combining and/or comparing the detected first and second magnetic field components. Ideally, the first and/or second component are detected near an intersection of respective symmetry planes of the first and the second multi-pole magnet strip.

To summarize, embodiments described herein propose a permanent magnet arrangement that produces a magnetic field along a path. The magnetic field can be detected by a magnetic sensor system arranged at least near to said path. Based thereon a position or movement of the magnetic field source may be detected.

The description and drawings merely illustrate the principles of embodiments of the invention. It will thus be appreciated that those skilled in the art will be able to devise various arrangements that, although not explicitly described or shown herein, embody the principles of example embodiments. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative hardware or circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

Further, it is to be understood that the disclosure of multiple acts or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A magnetic position sensor comprising:
a magnetic field source with
at least a first multi-pole magnet strip arranged on a first surface and with magnet poles formed of a first magnetic material; and
at least a second multi-pole magnet strip arranged on a second surface perpendicular to the first surface and with magnet poles formed of a second magnetic material that is different than the first magnetic material;
wherein the first and the second multi-pole magnet strip are arranged in a fixed relative position to each other and comprise different numbers of magnet poles along a common length.

2. The magnetic position sensor of claim 1, wherein the first multi-pole magnet strip extends in a first direction and wherein the second multi-pole magnet strip extends in a second direction parallel to the first direction.

3. The magnetic position sensor of claim 1, wherein the first and the second multi-pole magnet strips both extend linearly or circularly.

4. The magnetic position sensor of claim 1, wherein magnetic poles of the same magnetic polarity of the first multi-pole magnet strip have equal geometric dimensions and magnetic poles of the same magnetic polarity of the second multi-pole magnet strip have equal geometric dimensions.

5. The magnetic position sensor of claim 1, wherein the numbers of magnet pole pairs differ by one between the first and the second multi-pole magnet strip along the common length.

6. The magnetic position sensor of claim 1, wherein at least one of the first and the second multi-pole magnet strip is arranged on a ferromagnetic substrate.

7. The magnetic position sensor of claim 1, wherein the first and the second multi-pole magnet strip are arranged in between two ferromagnetic shields.

8. The magnetic position sensor of claim 1, further comprising:
a first magnetic field sensor element sensitive to a first directional component of a magnetic field generated by the magnetic field source; and
a second magnetic field sensor element sensitive to a second directional component of the magnetic field generated by the magnetic field source, the first and the second directional components being perpendicular to each other,
wherein the magnetic field source and the first and second magnetic field sensors are movable relative to each other.

9. The magnetic position sensor of claim 8, wherein the first magnetic field sensor element is arranged at a first sensing location where a magnetic field generated by the first multi-pole strip has a negligible first directional component, and wherein the second magnetic field sensor element is arranged at a second sensing location where the magnetic field generated by the second multi-pole strip has a negligible second directional component.

10. The magnetic position sensor of claim 8, further comprising:
a processor module configured to determine a position of the magnetic field source relative to a sensing location based on a combination of the detected first and second magnetic field components.

11. The magnetic position sensor of claim 8, wherein the detected first and second magnetic field components are perpendicular to a relative moving direction between the sensing location and the magnetic field source.

12. The magnetic position sensor of claim 8, wherein the sensing location is at or at least near an intersection of a first symmetry plane of the first multi-pole magnet strip and a second symmetry plane of the second multi-pole magnet strip.

13. The magnetic position sensor of claim 1, further comprising a first magnetic field sensor configured to exhibit a first sensitivity to detect a magnetic field component from the first magnetic material and a second magnetic field sensor configured to exhibit a second sensitivity that is different than the first sensitivity to detect a magnetic field component from the second magnetic material.

14. A magnetic position sensor system, comprising:
a magnetic field source including:
at least a first multi-pole magnet strip arranged on a first surface and extending in a first direction and comprising magnet poles formed of a first magnetic material, and
at least a second multi-pole magnet strip arranged in a fixed relative position to the first multi-pole magnet strip on a second surface perpendicular to the first surface and extending in a second direction parallel to the first direction and comprising magnet poles formed of a second magnetic material that is different than the first magnetic material,
wherein the first and the second multi-pole magnet strip comprise different numbers of magnet poles along a common length; and
a magnetic field sensor module at a sensing location, comprising
a first magnetic field sensor unit configured to measure a first component of a magnetic field caused at the sensing location by the magnetic field source; and
a second magnetic field sensor unit configured to measure a second component of the magnetic field caused at the sensing location by the magnetic field source, the first and the second magnetic field components being perpendicular to each other.

15. The magnetic position sensor system of claim 14, wherein the first and the second multi-pole magnet strip both extend linearly or circularly.

16. The magnetic position sensor system of claim 14, wherein the detected first and second magnetic field components are perpendicular to a moving direction of the first and the second multi-pole magnet strip.

17. A sensing method, the method comprising:
providing a superimposed magnetic field by
arranging at least a first multi-pole magnet strip that includes magnet poles formed of a first magnetic material on a first surface,
arranging at least a second multi-pole magnet strip that includes magnet poles formed of a second magnetic material that is different than the first magnetic material in a fixed relative position to the first multi-pole magnet strip on a second surface perpendicular to the first surface,
wherein the first and the second multi-pole magnet strips are provided with different numbers of magnet poles along a common length;
detecting, at a sensing location, a first component of the superimposed magnetic field; and
detecting, at the sensing location, a second component of the superimposed magnetic field.

18. The method of claim 17, wherein providing the superimposed magnetic field comprises:
moving the first and the second multi-pole magnet strip in a common direction relative to the sensing location.

19. The method of claim 17, further comprising:
determining a location of at least one of the first and the second multi-pole magnet strip relative to one or more sensing locations by combining the detected first and second magnetic field components.

20. The method of claim 17, further comprising:
detecting the first and second component at or at least near an intersection of a first symmetry surface of the first multi-pole magnet strip and a second symmetry surface of the second multi-pole magnet strip.

\* \* \* \* \*